United States Patent
Schön

(10) Patent No.: US 8,716,612 B2
(45) Date of Patent: May 6, 2014

(54) HOUSING OF A WEIGHING SCALE WITH A A CIRCUMFERENTIAL EDQE THAT RIMS THE CIRCUMFERENTIAL SEPARATING WALL, SO THAT WHEN THE HOUSING IS IN A CLOSED STATE, THE CIRCUMFERENTIAL EDGE CO-ACTS WITH AN INSIDE SURFACE OF THE SECOND HOUSING PART TO DEFINE A SECOND ENCLOSED SPACE SERVING TO HOUSE THE ELECTRONIC COMPONENTS

(75) Inventor: Thomas Schön, Balingen (DE)

(73) Assignee: Mettler-Toledo (Albstadt) GmbH, Albstadt (DE)

( * ) Notice: Subject to any disclaimer, the term of this patent is extended or adjusted under 35 U.S.C. 154(b) by 400 days.

(21) Appl. No.: 13/198,445

(22) Filed: Aug. 4, 2011

(65) Prior Publication Data
US 2012/0032571 A1 Feb. 9, 2012

(30) Foreign Application Priority Data
Aug. 5, 2010 (EP) ..................................... 10171991

(51) Int. Cl.
*G01G 21/28* (2006.01)
(52) U.S. Cl.
USPC ............ 177/238; 361/825; 361/829; 174/559

(58) Field of Classification Search
USPC .......................... 177/238–244; 361/825, 829; 174/559–561
See application file for complete search history.

(56) References Cited

U.S. PATENT DOCUMENTS

| | | | | |
|---|---|---|---|---|
| 6,329,593 | B1 * | 12/2001 | Yang | 174/559 |
| 7,002,084 | B2 | 2/2006 | Cox et al. | |
| 7,710,714 | B2 | 5/2010 | Rapp et al. | |
| 2008/0297998 | A1 * | 12/2008 | Choi | 361/681 |
| 2008/0298000 | A1 * | 12/2008 | Choi | 361/681 |
| 2008/0298001 | A1 * | 12/2008 | Choi | 361/681 |

FOREIGN PATENT DOCUMENTS

DE 20018255 U1 1/2001

* cited by examiner

*Primary Examiner* — Randy W Gibson
(74) *Attorney, Agent, or Firm* — Standley Law Group LLP

(57) ABSTRACT

A housing (1) encloses electronic components (2) that control operation of a weighing scale. The housing has a first housing part (10) and a second housing part (30). The respective housing parts are designed to form a first enclosed space (6) for housing the electronic components between the respective housing parts. A fastening module (60) is arranged between the respective housing parts. The fastening module has a first side (61) and an opposing second side (62). The first side includes first and second circumferential seating ledges (63, 64) that receive, respectively, the first and second housing parts.

18 Claims, 4 Drawing Sheets

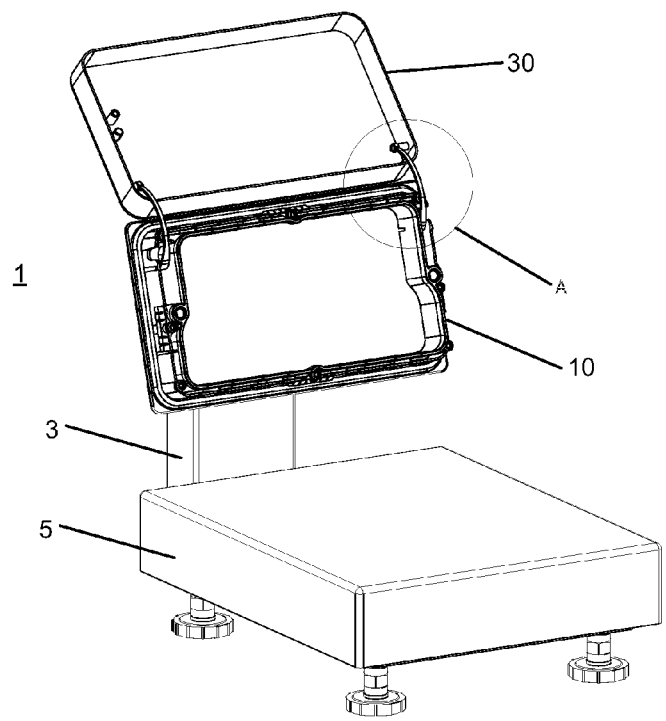
Figure 6
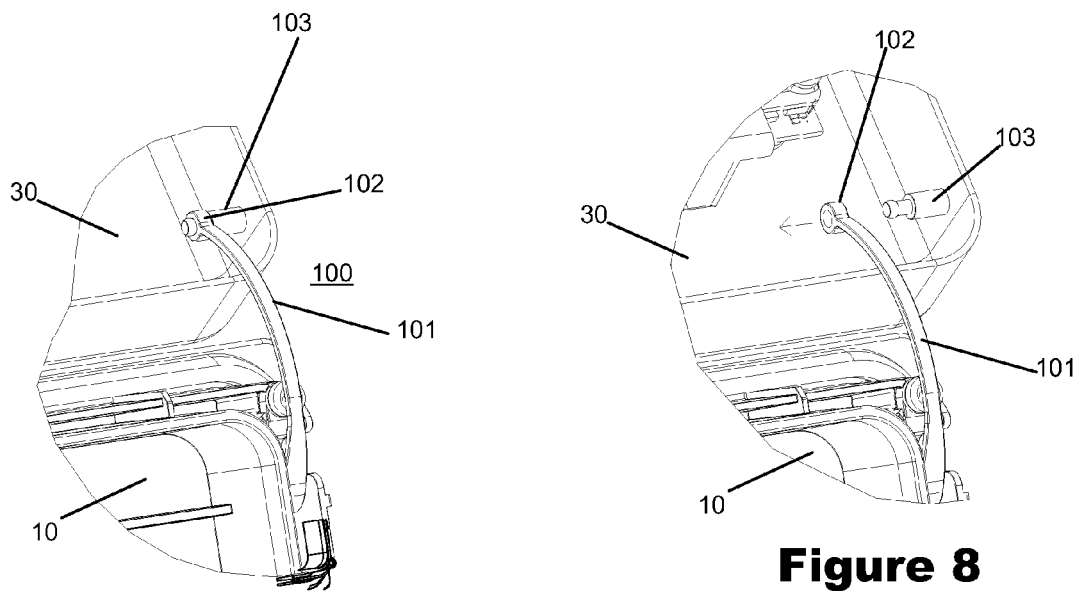
Figure 7
Figure 8

HOUSING OF A WEIGHING SCALE WITH A CIRCUMFERENTIAL EDQE THAT RIMS THE CIRCUMFERENTIAL SEPARATING WALL, SO THAT WHEN THE HOUSING IS IN A CLOSED STATE, THE CIRCUMFERENTIAL EDGE CO-ACTS WITH AN INSIDE SURFACE OF THE SECOND HOUSING PART TO DEFINE A SECOND ENCLOSED SPACE SERVING TO HOUSE THE ELECTRONIC COMPONENTS

CROSS-REFERENCE TO RELATED APPLICATIONS

This application is entitled to the benefit of a right of priority under 35 USC 119 from European application 10171991.2, filed 5 Aug. 2010. The content of that application is incorporated by reference as if fully recited herein.

TECHNICAL FIELD

This disclosure concerns a housing for a weighting scale, and particularly, a housing designed to enclose electronic components of the weighing scale of a type used primarily in the food industry. The electronic components to be enclosed serve not only for the operation of the scale but also, for example, for the control of a display- and operating unit of the scale. The housing normally has a first housing part and a second housing part. The first housing part and the second housing part work together so as to form between them an enclosed space serving to hold electronic components. A seal is arranged between the first and second housing parts, which prevents foreign matter from penetrating into the interior of the housing.

BACKGROUND OF THE ART

Weighing scales and peripheral equipment used in the food industry must meet stringent requirements regarding cleanability and hygienic safety. A typical area of application for these scales is in the production of foods. In this environment, the scale and the housing that encloses electronic components come into direct contact with the food products. The cleaning of these scales may among other methods involve the use of high-pressure cleaners. There needs to be assurance that the housing is sealed tight during the cleaning process and that for example contaminants are prevented from entering into the housing of the scale display, since the electronic components inside the housing could otherwise suffer damage. This requirement can be met with housing components made of stainless steel and by arranging a seal between the components. However, the manufacture of a stainless steel housing is subject to technical limitations. Due to these limits, the housing has a relatively large volume and the choices for the shape of the housing are limited. As a further drawback, the seal between two stainless steel elements can be susceptible to damage. The seal could be damaged especially when the housing is opened for maintenance work. As a consequence, there is a risk that the housing may no longer be sealed tight after a maintenance service has been performed. Due to leaks in the housing, water or cleaning agents could potentially penetrate into the housing during the cleaning process and cause damage to the electronic components.

There is an objective to provide a housing for electronic components which has a compact shape as well as the ability to stay reliably sealed.

This task is solved with a housing that comprises the features described in the independent patent claim. Further advantageous embodiments are presented in the dependent claims.

The disclosed housing, which serves to enclose electronic components for the control of a weighing scale, has a first housing part and a second housing part. The first and second housing parts are designed so that a first enclosed space is formed between them which serves to hold electronic components. Arranged between the first housing part and the second housing part is a fastening module having a first side and, opposite from the latter, a second side. The first side has a first circumferential seating ledge to receive the first housing part. The second side has a second circumferential seating ledge to receive the second housing part.

The shapes of the housing parts and of the fastening module need to be suitably selected, so that the two housing parts and the fastening module form an enclosed space to house electronic components.

The fastening module also functions as an intermediate part, possibly as an adapter, between the first and the second housing part. The two housing parts don't come into direct contact with each other. There is more flexibility for designing the seal between the housing parts and the fastening module. This has the advantage that the two housing parts do not have to be matched so closely to each other. As a result, there is greater latitude of design choices for the two housing parts. In particular, the inventive concept allows a more compact design of the display- and operating unit.

In an advantageous embodiment, the first circumferential seating ledge meets the first housing part in form-fitting contact. The first housing part has for example an essentially flat, planar surface in which the display- and operating unit is imbedded. Preferably, the display- and operating unit is also of an essentially planar configuration. The first circumferential seating ledge, likewise, has an essentially planar surface which works together with the planar surface of the first housing part through a form-fitting engagement. With this arrangement, it is possible to prevent contaminants from penetrating between the first housing part and the fastening module into the interior of the housing.

The fastening module can be releasably connected to the first housing part with at least one fastener means. A suitable fastener means is for example a screw. It is also possible to use a non-releasable connection between the fastening module and the first housing part, for example an adhesive. As a further possibility, the two parts could be connected to each other with a press fit. It is also possible to use a connection that can be released without tools, for example clips or snap fasteners.

The second circumferential seating ledge ideally has a continuous groove designed to receive a circumferential border edge of the second housing part. As an additional seal, there can be a sealing gasket arranged between the groove and the border edge. It is advantageous to fasten the sealing gasket to the second housing part through a fixed connection. This can be achieved for example with a liquid sealant which is injected into the groove where it solidifies. However, it is also possible to use a seal which is not permanently connected to the housing part. A standard seal gasket and/or an O-ring can be used for this purpose.

The second housing part in a possible embodiment is tub-shaped, and a circumferential separating wall is formed on the fastening module. The separating wall is rimmed by a circumferential edge. When the housing is in the closed state, the circumferential edge of the separating wall conforms to an inside surface of the tub-shaped second housing part, so that inside the first enclosed space there is a second enclosed space being formed which serves to house electronic parts. The second enclosed space is thus part of the first space. The second enclosed space is delimited by the fastening module and a part of the tub-shaped second housing part. The second space is encircled by a ring-shaped part of the first space. The ring-shaped part surrounds the second space like a buffer zone. No sensitive electronic components should be arranged in this ring-shaped part.

This configuration has the advantage that the second enclosed space is additionally protected from the entry of contaminants by the surrounding part of the first space. The electronic components arranged in the second space are thus protected from mechanical and chemical influences.

The arrangement of a seal gasket between the circumferential edge of the separating wall and the second housing part provides an additional barrier against the penetration of contaminants into the second space. Even if the first, outer seal gasket should become damaged by extraneous influences, the second, inner seal gasket still protects the electronic components from influences of the ambient environment.

With the use of the first and the second seal gasket, there is a greater probability that the housing still remains leak-tight after it has been opened and reclosed, because it is less probable that the first and second seals could get damaged simultaneously. In addition, the first seal protects the second seal from influences of the ambient environment. Even if the first seal is partially damaged, it still offers protection to the second seal against extraneous influences, particularly during an aggressive cleaning process.

With the use of the first and the second seal gasket, the specifications that the first seal gasket must meet are less demanding, as the second seal gasket serves as a backup. The requirements for the attachment of the second housing part to the fastening module will likewise be less severe. The second housing part can therefore be attached to the fastening module with a less elaborate connection, which has the advantage that the second housing part can also be removed and reattached in a simpler way. As an advantageous result, when performing maintenance work, the housing can be opened and closed again more quickly.

With preference, the fastening module is made essentially of a synthetic material, which offers the advantage that it makes the fastening module simple and cost-effective to manufacture. A synthetic material has the further advantage, that very complex shapes can be produced in a simple manner. As a consequence, when choosing the shape of the fastening module, many possibilities are open. The shape of the fastening module can in particular be adapted easily to the shapes of the two housing parts.

In an advantageous embodiment, the first housing part and the second housing part are made essentially of metal, specifically of chromium steel. Metal has the advantage that the housing will be easy to clean, however with the drawback that the manufacture of complex shapes is expensive.

The housing parts can be made by welding. However, a less favorable aspect of welding is that contaminants may accumulate at the weld seams.

Ideally, the first housing part and/or the second housing part is made of one integral piece. A seamless construction of the first and/or second housing part is likewise advantageous. The problem of accumulations along the seams can thus be avoided. The seamless housing can be produced for example by deep-drawing.

The housing enclosures that are used in the food industry must meet stringent requirements in regard to their cleanability. The radii at their corners and edges should therefore be as large as practically possible, ideally larger than 6 mm. The housing should have no slots or crevices. If the housing parts are castings, one needs to make certain that no air cavities are formed. Undercuts should also be avoided.

In a preferred embodiment, the second housing part is rigidly attached to a vertically oriented pedestal, and in the opened state of the housing the first housing part is releasably connected to the second housing part by means of a holder module. When the housing is opened, the first housing part remains tied to the second housing part through the holder module. If no holder module were used, the first housing part could possibly hang from electrical cables through which the electronic components mounted on the second housing part are connected to the display- and operating unit. This could cause damage to the electrical cables or the electronic components. The use of the holder module has the advantage that in order to perform service work on the electronic components, the first housing part does not have to be completely removed, but still remains connected to the second housing part without the risk of damage to the electrical cables or the electronic components.

It is possible to make the holder module of at least one flexible material which is fastened to the first as well as to the second housing part. The flexible material can be for example a synthetic material, a metal, or a textile material. The holder module can include a metallic wire, a textile ribbon, or a polymer element. To attach the holder module to the first and/or second housing part one could for example use screws. However, for the attachment to at least the first or the second housing part it is advantageous to use a fastener means that can be disconnected without using a tool, because this will allow the housing parts to be separated from each other quickly and easily in case this becomes necessary.

The holder module includes a connector element with a hinge lug and a hinge pin cooperating with the hinge lug. The connector element is solidly attached to the first housing part and the hinge pin to the second housing part. However, other configurations of the connector element are likewise conceivable.

BRIEF DESCRIPTION OF THE DRAWINGS

Following is a description of a preferred embodiment of the housing which is illustrated schematically in the drawings, wherein identical parts are identified by identical reference numbers and wherein:

FIG. 6 depicts a weighing scale with the FIG. 1 housing belonging to the display- and operating unit, shown in the opened condition;

FIG. 7 is a detail view of the connector element in the engaged condition; and

FIG. 8 is a detail view of the connector element in the unhinged condition.

DETAILED DESCRIPTION

Figure 1:
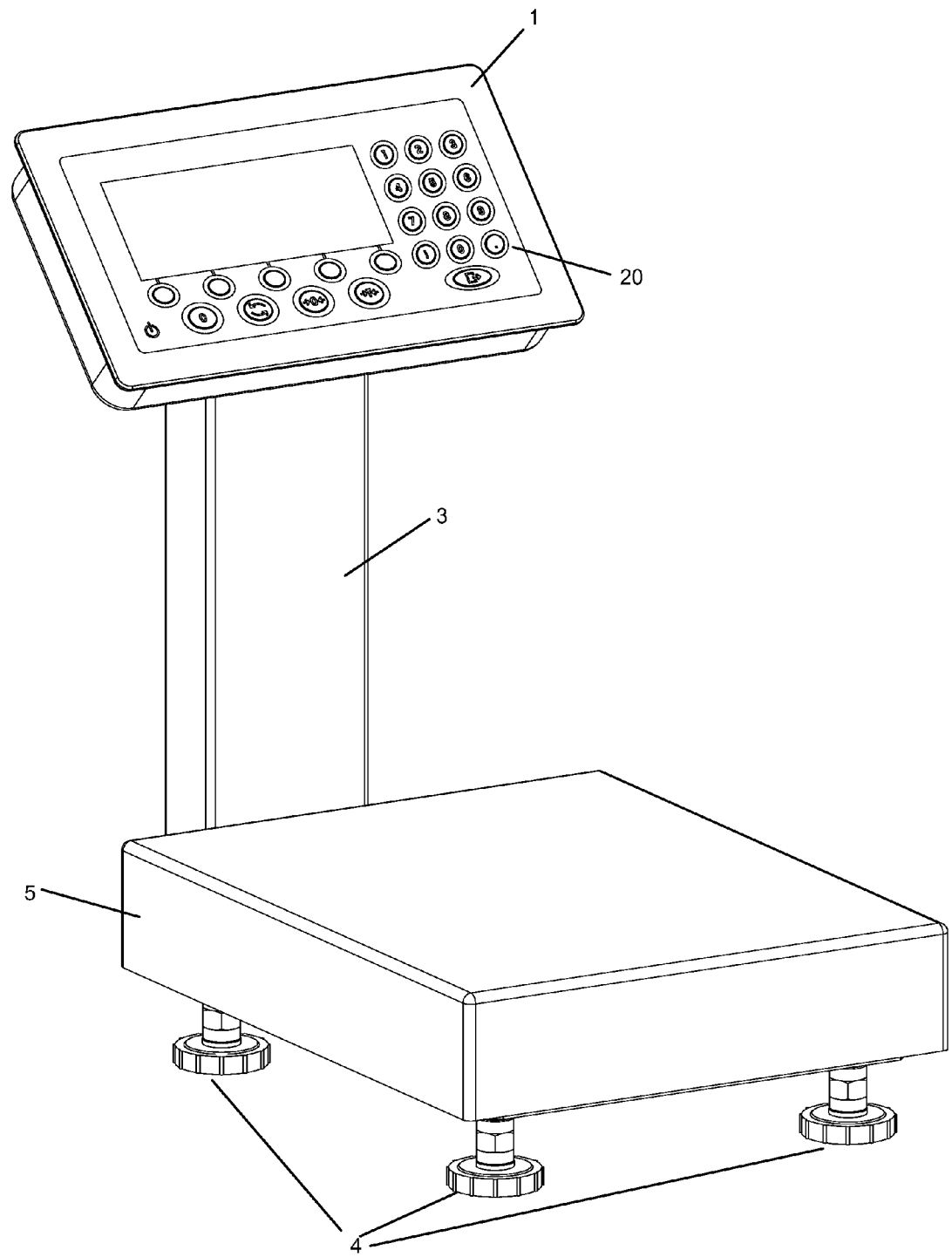
FIG. 1 depicts a weighing scale wherein an embodiment of the housing, which serves to enclose electronic components, belongs to the display- and operating unit.

FIG. 1 shows a weighing scale with a weighing platform 5. The weighing platform 5 stands on four feet 4. The displayand operating unit 20 is imbedded in the housing 1. The housing 1 is connected to the weighing platform 5 by means of a pedestal 3.

Figure 2:
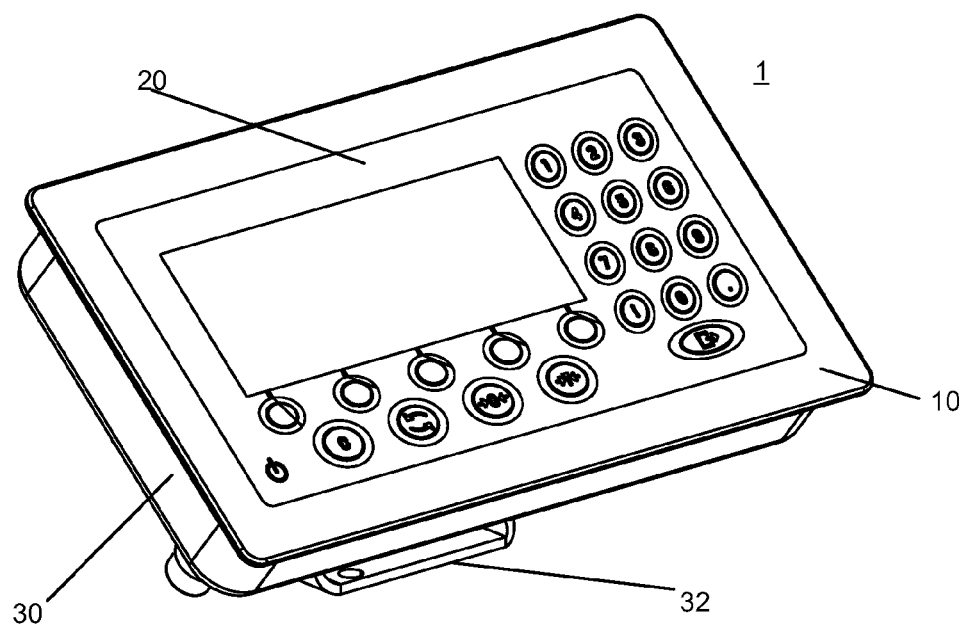
FIG. 2 is a perspective view of the FIG. 1 housing.

FIG. 2 represents a perspective view of the housing 1 with a first housing part 10 and a second housing part 30. The display- and operating unit 20 is imbedded in the first housing part 10. The first housing part 10 and the imbedded display- and operating unit 20 are of an essentially flat, planar shape. In the closed state of the housing 1, the first housing part 10 is connected to the second housing part 30. The second housing part 30 is tub-shaped. The first housing part 10 and the second housing part 30 are made of metal, preferably corrosion-free stainless steel. The tub-shaped second housing part 30 is of a seamless design. It can be produced for example by deep-drawing. Arranged on the second housing part 30 is a connector element 32 which serves for the attachment to the pedestal 3.

Figure 3:
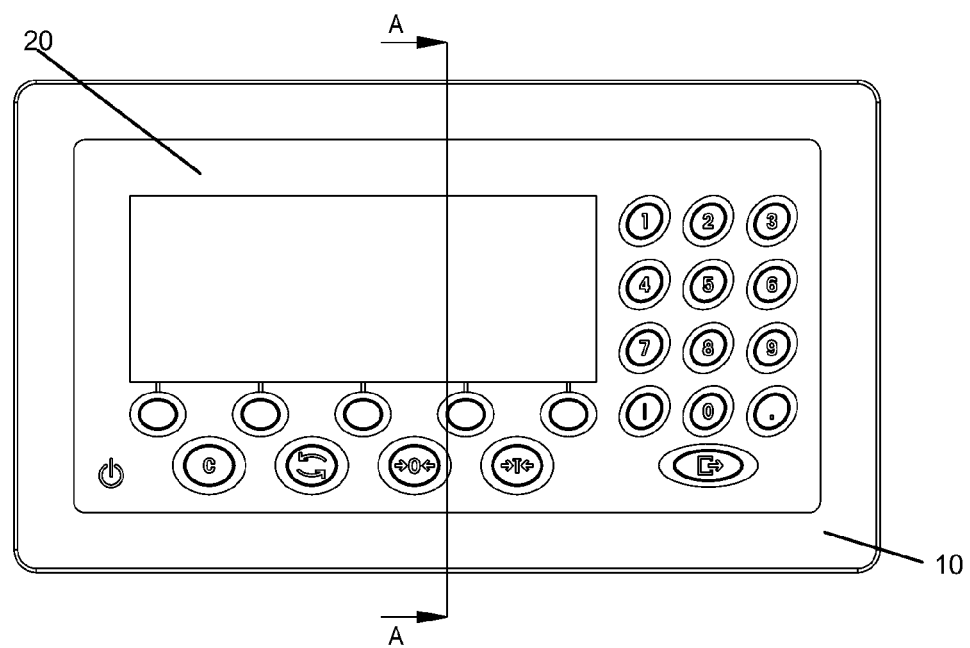
FIG. 3 is a plan view of the FIG. 1 housing.

FIG. 3 shows a plan view of the housing 1. The parts that are visible in the drawing are the first housing part 10 and the display- and operating unit 20.

Figure 4:
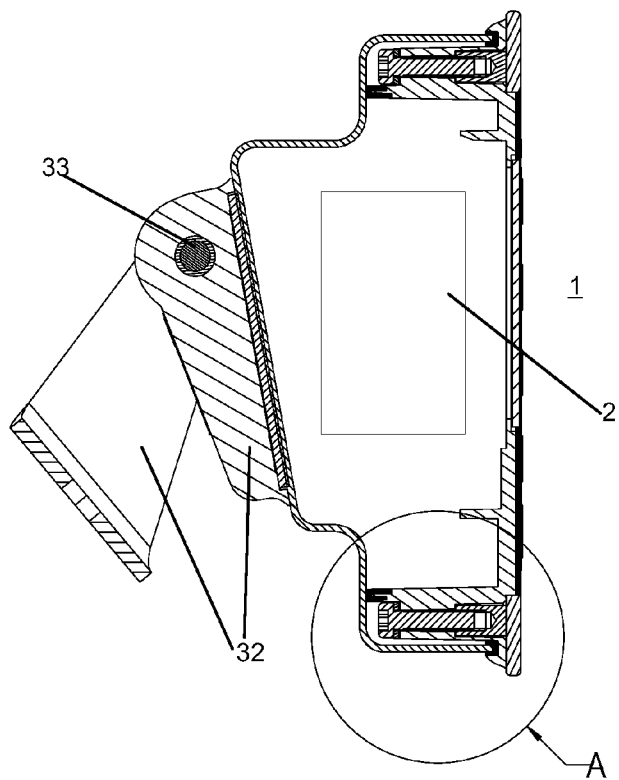
FIG. 4 is a sectional view of the FIG. 1 housing.

FIG. 4 represents a sectional view of the housing 1 in a plane which is indicated as A-A in FIG. 3. The connector element 32 to the pedestal consists of two parts that are rotatably connected to each other through a hinge pivot 33. A part of the connector element 32 to the pedestal is attached to the housing 1, and the other part of the connector element 32 is connected to the pedestal 3. Arranged in the interior of the housing 1 are electronic components 2. The electronic components 2 serve for example for the control of the display- and operating unit 20 and for the control of the weighing scale.

Figure 5:
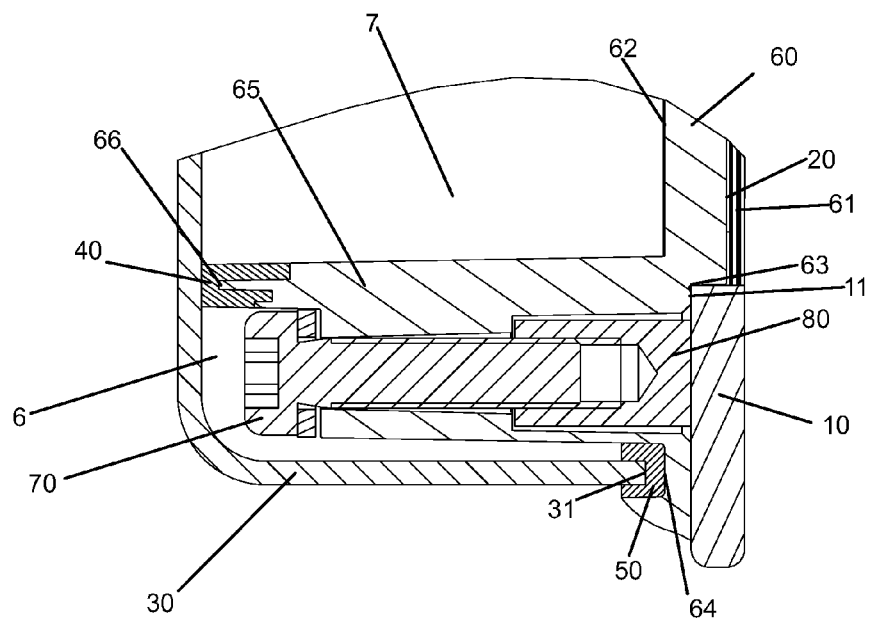
FIG. 5 is a detail view of the FIG. 1 housing shown in sectional view.

FIG. 5 represents a detail of the sectional view of the housing 1 which is framed by the circle A in FIG. 4. The principal components of the housing are a first housing part 10, a second housing part 30, and a fastening module 60. The fastening module 60 has a first side 61 and, opposite from the latter, a second side 62. The first housing part 10 is arranged on the first side 61 and second housing part 30 on the second side 62. The two housing parts 10, 30 cooperate with the fastening module 60 so as to form inside the housing parts 10, 30 a first space 6 for electronic components, which is closed off from the outside.

Imbedded in the flat, planar first housing part 10 is a likewise flat display- and operating unit 20. The display- and operating unit 20 serves for example for the visual presentation of the weighing results and for the operation of the weighing scale. Several threaded sleeves 80 are attached to the first housing part 10. The threaded sleeves 80 serve to hold screws 70, by means of which the fastening module 60 is connected to the first housing part 10. The first housing part 10 has a circumferential seating area 11 which works together with a first circumferential seating ledge 63 of the fastening module. The first housing part 10 and the fastening module 60 are in form-fitting contact with each other over a large surface area. This ensures a reliable seal against the outside, so that no additional sealing gasket is required.

The first circumferential seating ledge 63 is arranged on the first side 61, and a second circumferential seating ledge 64 is arranged on the second side 62. The second seating ledge 64 cooperates with a circumferential seating area 31 of the second housing part. The second seating ledge 64 of the fastening module is shaped as a groove which cooperates with the border edge 31 of the second housing part 30. The border edge thus forms the seating area 31 of the second housing part 30. As an additional sealing measure, a first seal gasket 50 can be inserted between the border edge and the groove.

The second housing part 30 is of tub-shaped configuration. A first enclosed space 6 is formed between the first housing part 10, which is of a flat planar shape, and the second housing part 30.

As an additional sealing measure, a second enclosed space 7 is formed inside the first enclosed space 6 by a circumferential separating wall 65 which is arranged on the fastening module 60. The separating wall 65 is rimmed by a continuous circumferential border edge 66 which meets the inside wall surface of the tub-shaped second housing part 30. As an additional seal, a second seal gasket 40 can be inserted between the border edge 66 and the tub-shaped second housing part 30.

FIG. 6 illustrates a weighing scale with the inventive housing 1 of the display- and operating unit in the opened state. The weighing scale has a weighing platform 5 and a pedestal 3. The pedestal 3 connects the weighing platform 5 to the housing 1 of the display- and operating unit.

FIG. 7 represents the detail that is framed by the circle A in FIG. 6. In the opened state of the housing 1, the holder module 100 keeps the first housing part 10 connected to the second housing part 30. The holder module 100 includes a connector element 101, a hinge lug 102 and hinge pin 103. The connector element 101 has two ends, i.e. a first end which is rigidly connected to the first housing part 10 and a second end which terminates in the hinge lug 102. The hinge pin 103 is rigidly connected to the second housing part 30. The hinge lug 102 can be engaged by the hinge pin 103, so that the connector element 101 keeps the first housing part 10 connected to the second housing part 30.

As shown in FIG. 8, the first housing part 10 can be separated from the second housing part 30 by pulling the hinge lug 102 off the hinge pin 103.

Ideally, the holder module 100 is made in part or in its entirety of a synthetic material. The connector element is preferably made of a flexible material.

Although the invention has been described through the presentation of a specific example of an embodiment, it is evident that numerous further variations could be created based on the knowledge gained from the present invention.

What is claimed is:

1. A device for housing electronic components used in the control of a weighing scale, comprising:
   a first housing part;
   a second housing part, the respective housing parts co-acting to define a first enclosed space, the second housing part having a tub-shaped configuration;
   a fastening module, arranged between the respective housing parts, having a first side and an opposing second side, each of the respective sides comprising a circumferential seating ledge, the first circumferential seating ledge configured to receive the first housing part and the second circumferential seating ledge configured to receive the second housing part;
   a circumferential separating wall formed on the fastening module; and
   a circumferential edge that rims the circumferential separating wall, so that when the device is in a closed state, the circumferential edge co-acts with an inside surface of the second housing part to define a second enclosed space that is formed inside the first enclosed space, the second enclosed space serving to house the electronic components.

2. The device of claim 1, wherein:
   the first circumferential seating ledge receives the first housing part in a form-fitting contact.

3. The device of claim 2, further comprising:
a continuous groove on the second circumferential seating ledge; and
a circumferential border edge of the second housing part, sized and shaped to be received in the continuous groove.

4. The device of claim 3, further comprising:
a first circumferential seal gasket, arranged between the circumferential border edge and the continuous groove.

5. The device of claim 1, further comprising:
a second circumferential seal gasket, arranged between the circumferential border edge of the separating wall and the second housing part.

6. The device of claim 1, wherein:
the first housing part has a substantially flat, planar shape;
a substantially flat, planar display/operating unit is imbedded in the first housing part.

7. The device of claim 1, further comprising:
a means for fastening that releasably connects the fastening module to the first housing part.

8. The device of claim 1, wherein:
the fastening module is made substantially of synthetic material.

9. The device of claim 1, wherein:
at least one of the respective housing parts is made substantially of metal.

10. The device of claim 1, wherein:
at least one of the respective housing parts is made of one integral piece.

11. The device of claim 1, wherein:
at least one of the respective housing parts is of a substantially seamless design.

12. The device of claim 1, further comprising:
a holder module that, when the device in an open state, releasably connects the first and second housing parts, while the second housing part is solidly connected to a pedestal.

13. The device of claim 12, wherein:
the holder module comprises:
a connector element, solidly attached to the first housing part, having a hinge lug; and
a hinge pin, solidly attached to the second housing part, that cooperates with the hinge lug.

14. The device of claim 1, further comprising:
a continuous groove on the second circumferential seating ledge; and
a circumferential border edge of the second housing part, sized and shaped to be received in the continuous groove.

15. The device of claim 4, further comprising:
a second circumferential seal gasket, arranged between the circumferential border edge of the separating wall and the second housing part.

16. The device of claim 4, further comprising:
a holder module that, when the device in an open state, releasably connects the first and second housing parts, while the second housing part is solidly connected to a pedestal.

17. The device of claim 16, wherein:
the holder module comprises:
a connector element, solidly attached to the first housing part, having a hinge lug; and
a hinge pin, solidly attached to the second housing part, that cooperates with the hinge lug.

18. A device for housing electronic components used in the control of a weighing scale, comprising:
a first housing part;
a second housing part, the respective housing parts co-acting to define a first enclosed space, the second housing part having a tub-shaped configuration and having a circumferential border edge;
a fastening module, arranged between the respective housing parts, having a first side and an opposing second side, each of the respective sides comprising a circumferential seating ledge, the first circumferential seating ledge receiving the first housing part in a form-fitting contact and the second circumferential seating ledge comprising a continuous groove sized and shaped to receive the circumferential border edge of the second housing part;
a circumferential separating wall formed on the fastening module;
a circumferential edge that rims the circumferential separating wall; such that, when the device is in a closed state, the circumferential edge co-acts with an inside surface of the second housing part to define a second enclosed space that is formed inside the first enclosed space, the second enclosed space serving to house the electronic components;
a first circumferential seal gasket, arranged between the circumferential border edge and the continuous groove; and
a second circumferential seal gasket, arranged between the circumferential border edge of the separating wall and the second housing part; and
a holder module that, when the device in an open state, releasably connects the first and second housing parts, while the second housing part is solidly connected to a pedestal, the holder module comprising:
a connector element, solidly attached to the first housing part, having a hinge lug;
a hinge pin, solidly attached to the second housing part, that cooperates with the hinge lug.

* * * * *

UNITED STATES PATENT AND TRADEMARK OFFICE
CERTIFICATE OF CORRECTION

PATENT NO. : 8,716,612 B2  Page 1 of 1
APPLICATION NO. : 13/198445
DATED : May 6, 2014
INVENTOR(S) : Schön It is certified that error appears in the above-identified patent and that said Letters Patent is hereby corrected as shown below:

On the Title Page, Item (54), and in the Specification, Column 1, lines 1-10, please delete "HOUSING OF A WEIGHING SCALE WITH A A CIRCUMFERENTIAL EDQE THAT RIMS THE CIRCUMFERENTIAL SEPARATING WALL, SO THAT WHEN THE HOUSING IS IN A CLOSED STATE, THE CIRCUMFERENTIAL EDGE CO-ACTS WITH AN INSIDE SURFACE OF THE SECOND HOUSING PART TO DEFINE A SECOND ENCLOSED SPACE SERVING TO HOUSE THE ELECTRONIC COMPONENTS" and insert -- HOUSING OF A WEIGHING SCALE WITH A CIRCUMFERENTIAL EDGE THAT RIMS THE CIRCUMFERENTIAL SEPARATING WALL, SO THAT WHEN THE HOUSING IS IN A CLOSED STATE, THE CIRCUMFERENTIAL EDGE CO-ACTS WITH AN INSIDE SURFACE OF THE SECOND HOUSING PART TO DEFINE A SECOND ENCLOSED SPACE SERVING TO HOUSE THE ELECTRONIC COMPONENTS --.

Signed and Sealed this
Twenty-sixth Day of August, 2014

Michelle K. Lee
*Deputy Director of the United States Patent and Trademark Office*